(12) United States Patent
Addis (10) Patent No.: US 7,270,333 B2
(45) Date of Patent: Sep. 18, 2007

(54) BRUSH SEAL WITH ADJUSTABLE CLEARANCE

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/065,897

(22) Filed: Nov. 27, 2002

(65) Prior Publication Data

US 2004/0100030 A1     May 27, 2004

(51) Int. Cl.
   *F16J 15/4447*   (2006.01)
(52) U.S. Cl. ................. 277/355; 415/173.3; 415/173.5
(58) Field of Classification Search ................. 277/355; 415/173.3, 173.5
   See application file for complete search history.

(56) References Cited

U.S. PATENT DOCUMENTS

| 885,032 | A | | 4/1908 | Ferranti |
|---|---|---|---|---|
| 4,781,388 | A | | 11/1988 | Wohrl et al. |
| 4,957,301 | A | | 9/1990 | Clay, Jr. et al. |
| 5,026,252 | A | * | 6/1991 | Hoffelner ................. 415/174.2 |
| 5,066,024 | A | | 11/1991 | Reisinger et al. |
| 5,066,025 | A | | 11/1991 | Hanrahan |
| 5,090,710 | A | | 2/1992 | Flower |
| 5,114,159 | A | | 5/1992 | Baird et al. |
| 5,135,237 | A | | 8/1992 | Flower |
| 5,283,943 | A | | 2/1994 | Aguayo et al. |
| 5,316,318 | A | | 5/1994 | Veau |
| 5,425,543 | A | | 6/1995 | Buckshaw et al. |
| 5,474,305 | A | | 12/1995 | Flower |
| 5,678,898 | A | | 10/1997 | Bagepalli et al. |
| 5,688,105 | A | * | 11/1997 | Hoffelner ................. 415/170.1 |
| 5,704,760 | A | | 1/1998 | Bouchard et al. |
| 5,799,952 | A | | 9/1998 | Morrison et al. |
| 5,975,535 | A | | 11/1999 | Gail et al. |
| 6,062,463 | A | | 5/2000 | Hoffmueller et al. |
| 6,168,162 | B1 | * | 1/2001 | Reluzco et al. ............. 277/355 |
| 6,168,377 | B1 | * | 1/2001 | Wolfe et al. ............. 415/174.2 |
| 6,192,291 | B1 | | 2/2001 | Kwon |
| 6,196,550 | B1 | | 3/2001 | Arora et al. |
| 6,250,640 | B1 | * | 6/2001 | Wolfe et al. ................. 277/355 |
| 6,257,588 | B1 | | 7/2001 | Bagepalli et al. |
| 6,293,553 | B1 | | 9/2001 | Werner et al. |
| 6,302,400 | B1 | | 10/2001 | Werner et al. |
| 6,318,728 | B1 | * | 11/2001 | Addis et al. ................. 277/355 |
| 6,328,311 | B1 | | 12/2001 | Plona et al. |
| 6,331,006 | B1 | | 12/2001 | Baily et al. |
| 6,378,873 | B1 | | 4/2002 | Mayer et al. |
| 6,382,632 | B1 | | 5/2002 | Chupp et al. |

(Continued)

FOREIGN PATENT DOCUMENTS

DE          39 07 614    *  9/1990

(Continued)

*Primary Examiner*—Gary S. Hartmann
(74) *Attorney, Agent, or Firm*—Bachman & LaPointe (57) ABSTRACT

A brush seal, comprising: a bristle arrangement having a retention section; a pair of plates flanking the bristle arrangement and having a clamping section to frictionally engage the retention section. The clamping section allows movement of the retention section before the plates are secured together, to place the bristle arrangement at a desired position between the plates, and prevents movement of the retention section after the plates are secured together.

9 Claims, 7 Drawing Sheets

U.S. PATENT DOCUMENTS

| | | | |
|---|---|---|---|
| 6,471,212 B1 * | 10/2002 | Dierker et al. | 277/355 |
| 6,669,203 B1 * | 12/2003 | Mortzheim | 277/355 |
| 6,685,427 B1 * | 2/2004 | Dhar et al. | 415/173.3 |
| 6,695,314 B1 * | 2/2004 | Gail et al. | 277/355 |

FOREIGN PATENT DOCUMENTS

| | | | |
|---|---|---|---|
| EP | 0 357 536 | | 3/1990 |
| EP | 0 469 826 | | 7/1991 |
| EP | 0 652 539 | | 3/1999 |
| EP | 1 241 384 | | 9/2002 |
| EP | 0 875 365 | | 3/2003 |
| EP | 1 347 218 | * | 9/2003 |
| GB | 2 303 671 | * | 7/1996 |
| GB | 2 304 158 | * | 8/1996 |
| GB | 2 347 522 | | 9/2000 |
| GB | 2 353 124 | | 2/2001 |
| WO | 99/06673 | | 2/1999 |

* cited by examiner

BRUSH SEAL WITH ADJUSTABLE CLEARANCE

CROSS REFERENCE TO RELATED APPLICATIONS

This application is related to pending U.S. patent application Ser. No. 10/074,191 filed on 12 Feb. 2002, herein incorporated by reference.

BACKGROUND OF INVENTION

This invention relates to brush seals. Specifically, the present invention relates to brush seals with adjustable clearances. As used herein, the phrase brush seal clearance refers to the distance that the bristles extend past the plates.

Proper operation of a turbine engine should occur when the myriad engine parts remain within acceptable limits of alignment with other engine parts. The performance of the engine tends to decline when the alignment exceeds these acceptable limits. This is particularly true when dealing with seals.

Many factors influence whether parts maintain proper alignment. Assembly techniques and rotor balancing clearly affect part alignment Unexpected situations, like foreign object damage, can also create misalignments. Misalignment can even occur with normal operation of the engine. Typically, thermal conditions cause this type of misalignment. For example, steam turbine rotors can bow over time.

Conventional methods exist to handle such misalignment. For example, the technician could re-machine certain features of the engine to return to proper alignment. Re-machining features on an installed turbine engine, however, can prove time consuming and costly.

Another method is for the operator to maintain an inventory of spare engine hardware. This allows a technician to replace the misaligned parts rapidly. Likewise, this method can prove expensive in terms of inventory costs.

SUMMARY OF INVENTION

It is an object of the present invention to provide a brush seal with an adjustable clearance.

It is a further object of the present invention to provide a brush seal in which a technician can adjust the clearance in the field.

It is a further object of the present invention to provide a brush seal that can adjust clearance without re-machining the brush seal.

It is a further object of the present invention to provide a brush seal that allows replacement of specific components.

It is a further object of the present invention to provide a brush seal with adjustable bristle stiffness.

These and other objects of the present invention are achieved in one aspect by a brush seal, comprising: a bristle arrangement having a retention section; a pair of plates flanking the bristle arrangement and having a clamping section to frictionally engage the retention section. The clamping section allows movement of said retention section before the plates are secured together and prevents movement of the retention section after said plates are secured together.

These and other objects of the present invention are achieved in another aspect by brush seal segment, comprising: a bristle arrangement having a retention section; a pair of plates flanking the bristle arrangement and having a clamping section to frictionally engage the retention section. The clamping section allows movement of the retention section before the plates are secured together and prevents movement of the retention section after the plates are secured together.

These and other objects of the present invention are achieved in another aspect by a method of assembling a brush seal, comprising the steps of: providing a pair of plates and a bristle arrangement, the bristle arrangement locatable between the plates at a plurality of positions; selectively locating the bristle arrangement at a desired one of the positions; and securing the plates together to retain the bristle arrangement at the desired position.

BRIEF DESCRIPTION OF DRAWINGS

Other uses and advantages of the present invention will become apparent to those skilled in the art upon reference to the specification and the drawings, in which.

DETAILED DESCRIPTION

Figure 1:
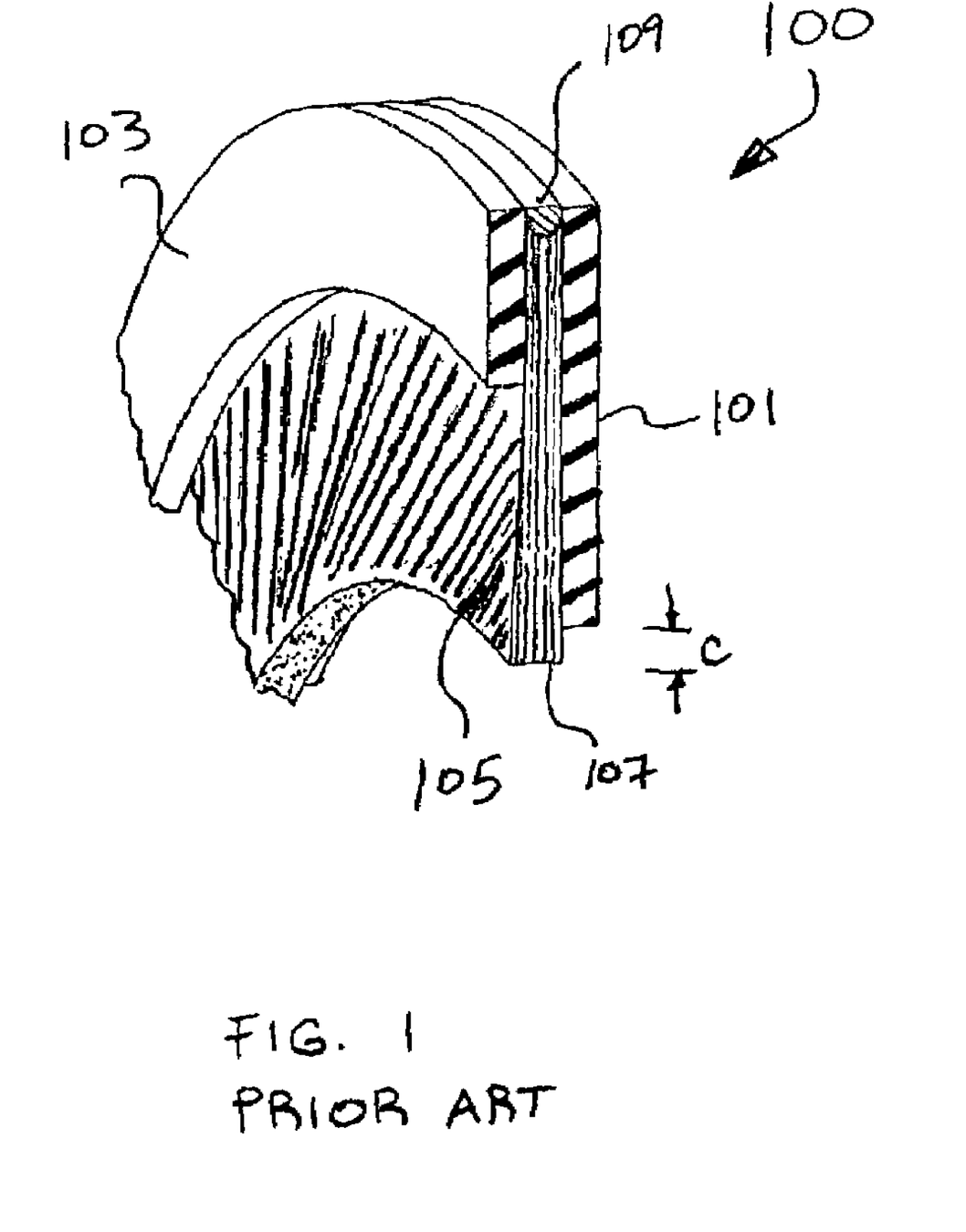
FIG. 1 is a cross-sectional view of a conventional brush seal.

FIG. 1 displays a conventional annular brush seal 100. Although shown as a single stage, the brush seal 100 could have multiple stages. The brush seal 100 includes several sub-assemblies, namely a back plate 101, side plate 103 and a bristle pack 105. The plates 101, 103 flank the bristle pack 105.

The bristle pack 105 comprises a plurality of densely arranged wire bristles. Each of the bristles has a first end 107 and an opposed second end 109. While extending at an angle to a radial line, the first ends 107 of the bristles reside at the inner diameter of the brush seal 100. The second ends 109 of the bristles reside at the outer diameter of the brush seal 100.

The plates 101, 103 and the bristle pack 105 are welded together to form the brush seal 100. Specifically, the outer diameter of the plates 101, 103 and the bristle pack 105 are welded together to sandwich the bristles between the plates 101, 103. Typically, the weld process occurs long before installation of the brush seal 100 in the engine. That means a clearance C between the bristle pack 105 and the back plate 101 is set long before installation. Accordingly, the brush seal 100 may not be able to accommodate, for example, any misalignment between the engine parts.

In addition, welding the components 101, 103, 105 together requires the removal of the entire brush seal 100 despite instances where less than all of the components require replacement.

Figure 2:
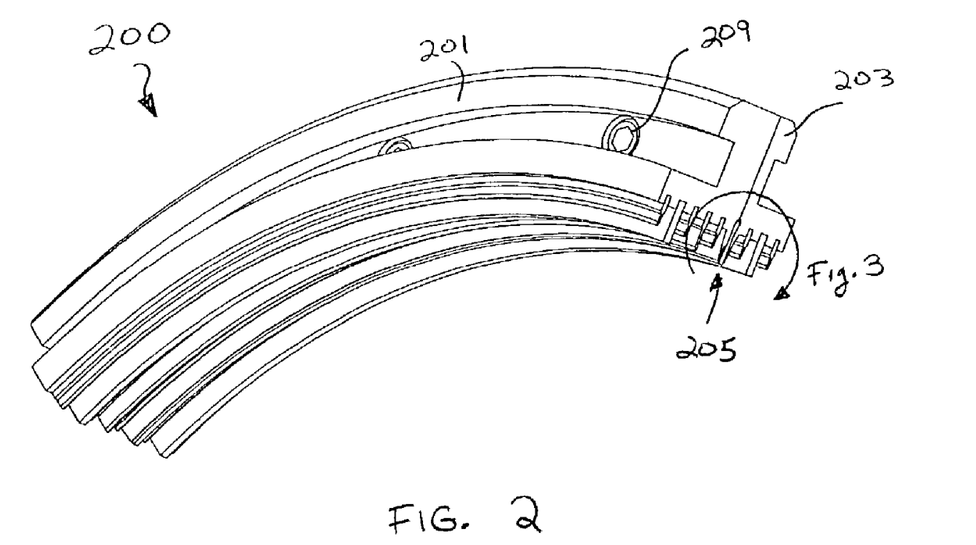
FIG. 2 is a perspective view of a brush seal of the present invention.
Figure 3:
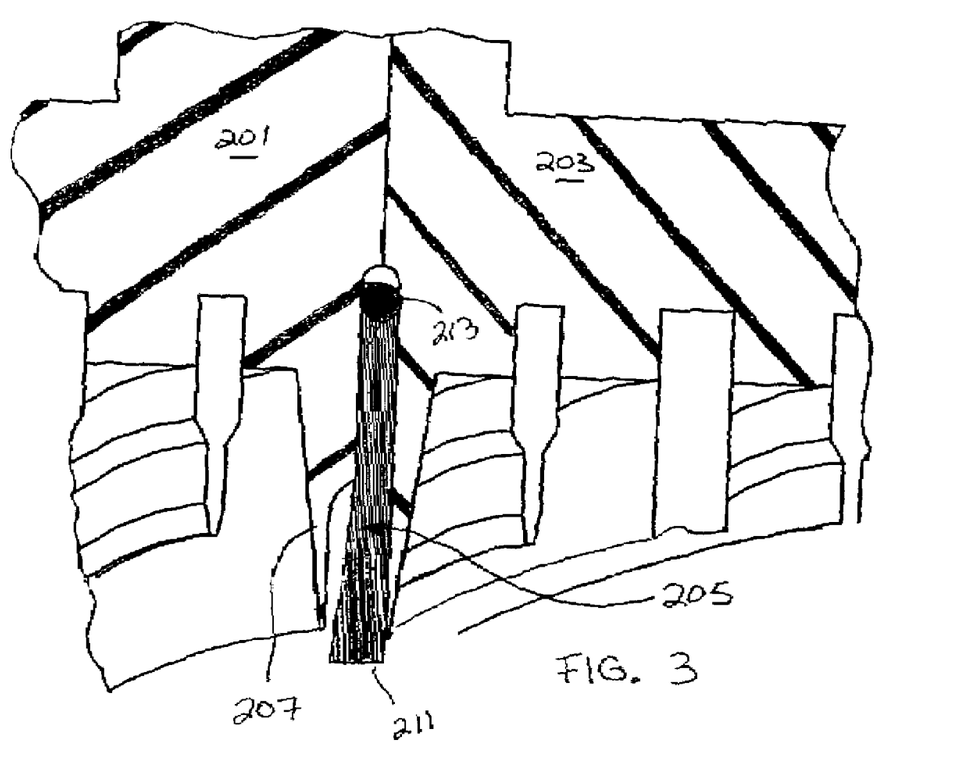
FIG. 3 is a detailed view of the brush seal of FIG. 2.

FIGS. 2 and 3 display one embodiment of the present invention. The figures display the present invention in one possible embodiment—a packing ring segment 200. Packing ring segments 200 includes both a labyrinth seal and a brush seal to prevent fluid from exiting through a gap between a stationary component (such as the engine case) and a rotating component (such as the rotor shaft). When fully arranged, the segments 200 form an annual packing ring (not shown) within the engine. The packing ring is typically spring loaded (not shown) to urge the ring against the rotor.

Although the packing ring segment 200 has other features, only features relevant to the brush seal will be described. The segment 200 includes a first plate 201, second plate 203 and a pre-assembled bristle arrangement 205. The first plate 201, located upstream, preferably acts like a side plate. The side plate could include a windage cover 207. The second plate, located downstream, preferably acts like a back plate.

The bristle arrangement 205 includes a plurality of bristles 211 secured together by a joint 213. The bristles 211 could be made from any suitable material such as a cobalt alloy wire. FIGS. 2 and 3 show a radial brush seal arrangement with the bristles 211 extending radially. Alternatively, the brush seal could be an axial brush seal with the bristles 211 extending in the axial direction.

The joint 213 secures one end of the bristles 211 together and obviates the need to weld the bristles 211 to the plates 201, 203. Preferably, the joint 213 is a weld joint. U.S. patent application Ser. No. 10/074,191 describes in more detail the method of making the bristle arrangement 205. The present invention could, however, use other methods to produce the joint 213.

Suitable fasteners 209, such as machine screws, secure the plates 201, 203 together. When secured together, the plates 201, 203 sandwich the bristle arrangement 205 and prevent movement of the bristle arrangement 205 during operation of the turbine engine. In the radial arrangement shown in the figures, the plates 201, 203 prevent radial movement of the bristle arrangement 205. The plates 201, 203 preferably restrain the bristle arrangement 205 without an interference fit. The present invention could have features (not shown) to prevent the fasteners 209 from backing out from engine vibration. Examples include a locking feature (not shown) or subjecting the segment 200 to chemical treatment (not shown) or staking of the surrounding packing body material (not shown).

The present invention however, allows a technician to adjustably position the bristle arrangement 205 before the fasteners 209 secure the first and second plates 201, 203 together. In other words, the present invention allows the technician to adjust the bristle arrangement 205 radially to change the clearance of the brush seal. FIGS. 4a-d demonstrate this capability.

Figure 4A:
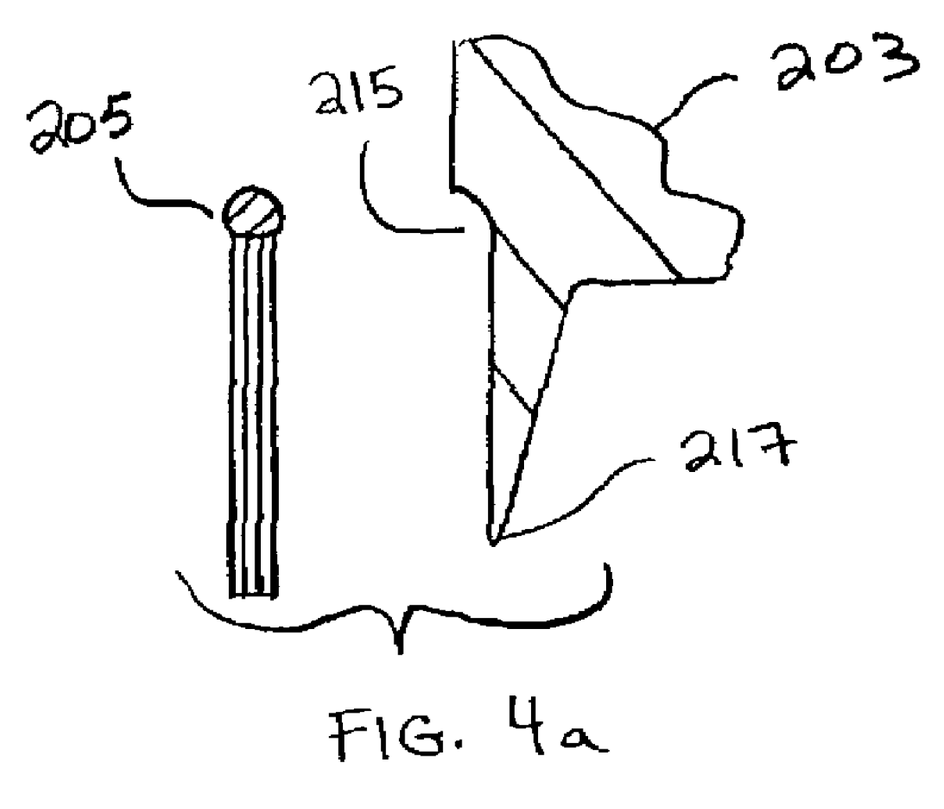
FIGS. 4a-d are various views during the assembly of the brush seal of the present invention.

FIG. 4a displays the second plate 203 before receiving the bristle arrangement 205. The second plate 203 includes a clamping section to receive a retention section of the bristle arrangement 205. Specifically, the second plate 203 includes a channel 215 in the surface of the second plate 203 that faces the first plate 201. The joint 213 of the bristle arrangement 205 preferably acts as the retention section. At a minimum, the channel 215 receives the joint 213 of the bristle arrangement 205. As seen in the figure, the channel 215 extends to a distal end 217 of the second plate 203 to receive the joint 213 and a length of the bristles 211 of the bristle arrangement 205.

Figure 4B:
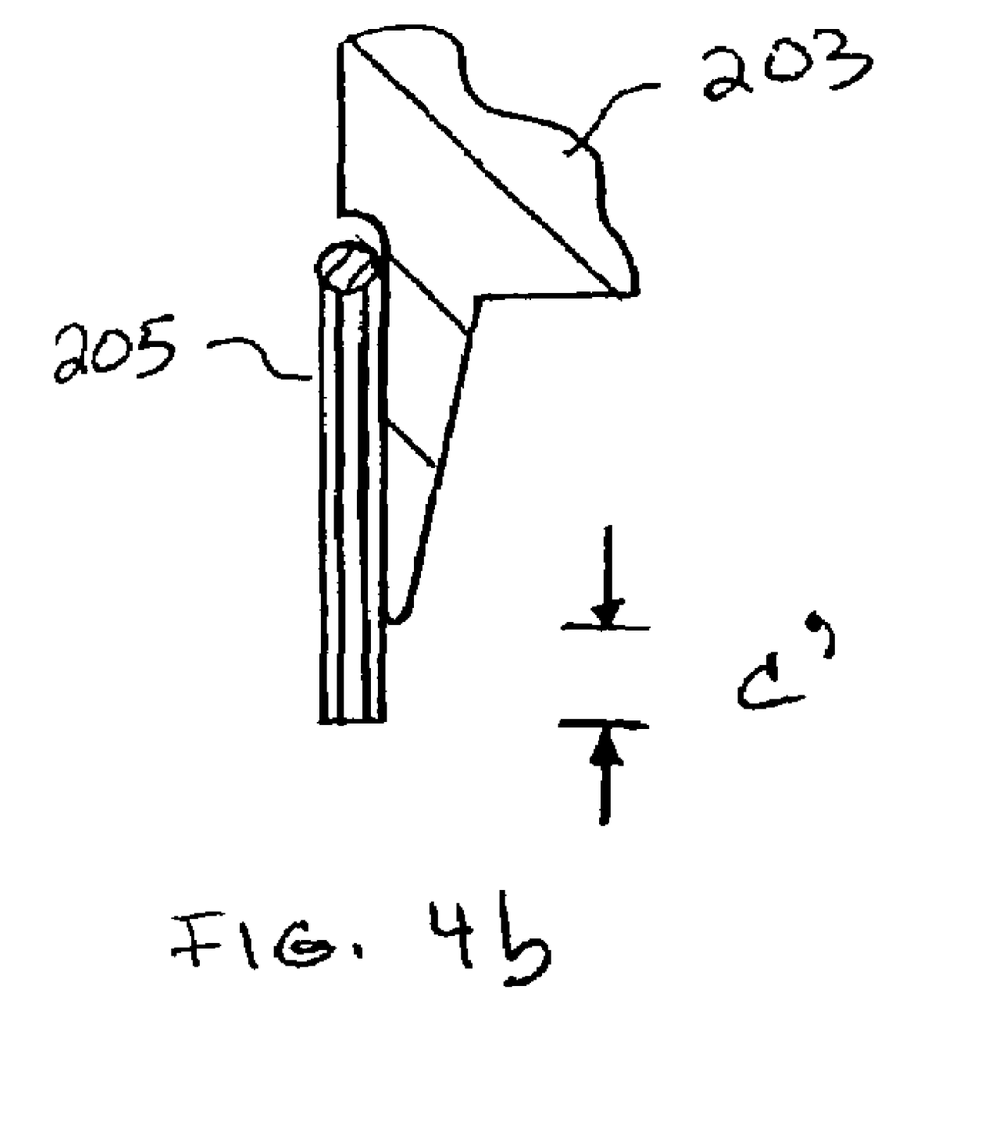

Next, the technician places the bristle arrangement 205 in the channel 215 as seen in FIG. 4b. At this point, the brush seal exhibits an initial clearance C' between the bristle arrangement 205 and the second plate 203.

Figure 4C:
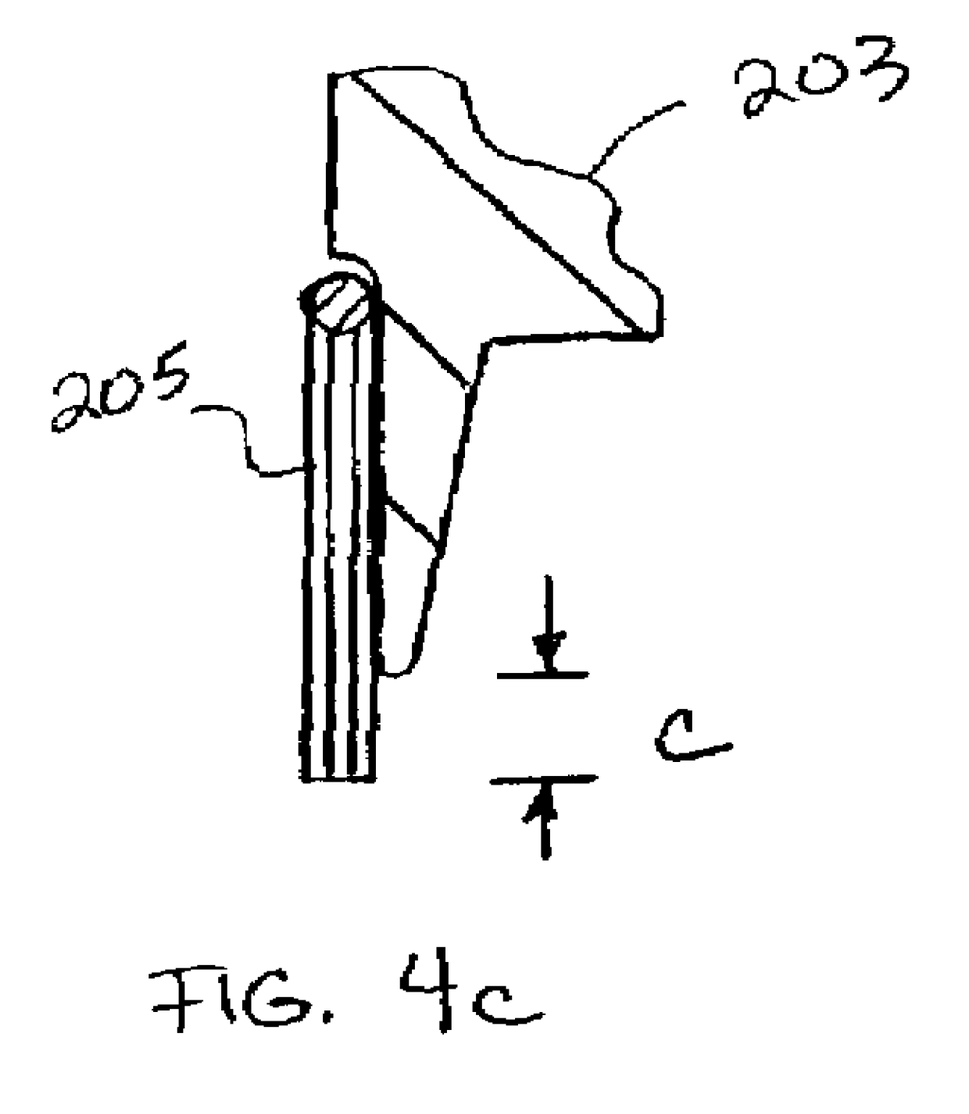

The technician can then adjust the bristle arrangement 205 in the channel 215 to achieve a desired clearance C as seen in FIG. 4c. The desired clearance could be either larger or smaller than the initial clearance C'. Preferably, the present invention allows the technician to adjust the bristle arrangement 205 within a range of between approximately 25% below and above an average clearance.

Although FIG. 4c shows just the second plate 203 and the bristle arrangement 205, the technician could adjust the clearance C with the bristle arrangement 205 positioned between both plates 201, 203 (provided the technician has not yet tightened the fasteners 209).

Figure 4D:
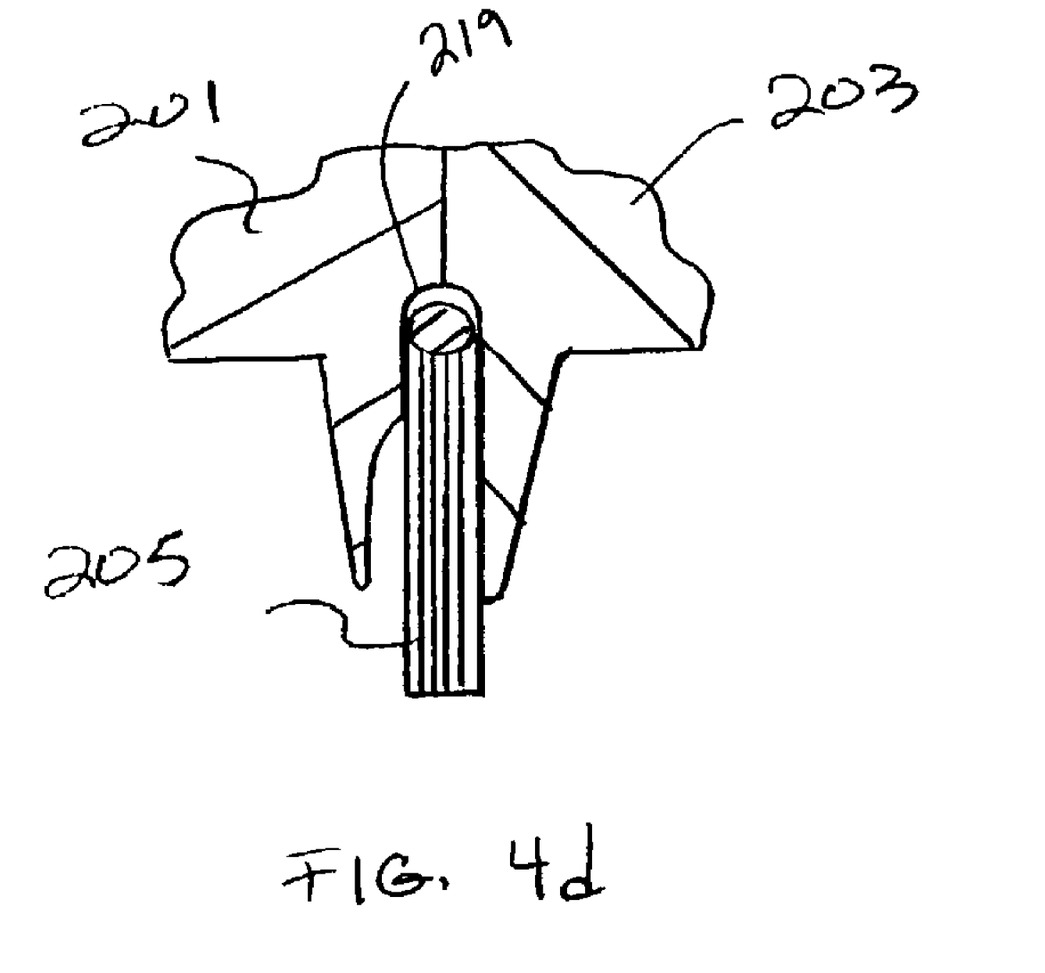

After selecting the proper clearance C, the technician secures the first plate 201 to the second plate 203 as discussed above. As seen in FIG. 4d, the first plate 201 has a channel 219 corresponding to the channel 215 in the second plate 203. Both channels 215, 219 define the clamping section of the brush seal.

In an alternative arrangement, only one of the plates 201, 203 could contain such a channel. The other plate would have a planar surface. Regardless of whether one or both of the plates 201, 203 have such channels, the depth of the clamping section should correspond to the width of the joint 213 of the bristle arrangement 205. Preferably, the plates 201, 203 frictionally retain the bristle arrangement 205 without an interference fit.

Similarly, the clamping section of the plates 201, 203 should have a length greater than the retention section of the bristle arrangement 205. This allows the technician to adjust the clearance C.

Although described as useful during assembly of the brush seal, the present invention is also useful during maintenance, repair and/or overhaul of the engine. During a maintenance operation, the technician may remove the segment 200 using conventional techniques. Rather than scrapping the entire segment 200 due to worn or damaged bristles 211, the present invention allows the technician to replace the used bristle arrangement 205 and to reuse the plates 201, 203. Specifically, the technician removes the fasteners 209 to separate the plates 201, 203. The technician then substitutes the used bristle arrangement 205 with a replacement bristle arrangement 205. As described above, the technician adjusts the clearance C of the bristle arrangement 205 before securing the plates 201, 203 together with the fasteners. Using conventional techniques, the technician reinstalls the segment 200 in the engine.

Another important aspect of the present invention is bristle stiffness. Conventionally, brush seals are designed to fit the needs of a specific location within an engine. A prime consideration during such design is the expected pressure drop at that engine location.

The present invention, however, obviates the need to custom design seals for specific engine locations. In other words, the present invention allows the use of one seal design at different engine locations exhibiting different pressure drops. Varying the clearance C of the bristle arrangement 205 as described above also alters the stiffness of the bristles 211. Similar to a cantilever beam, the free length of the bristles 211 determines stiffness. Free length is the distance from bristle pinch/clamping point (between side plate 201 and back plate 203) to the free end of the bristle 211. As free length increases, stiffness decreases. This allows, for example, the technician to use a seal at an engine location having a smaller pressure drop by increasing clearance C. Conversely, the technician could use the same seal at an engine location having a larger pressure drop by decreasing clearance C.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A brush seal segment, comprising:
a pre-assembled bristle arrangement having a plurality of linear bristles with each of said bristles having a first end and a second end opposed to said first end, and a retention section attached to the second end of said bristles to join said bristles together;
a pair of plates flanking said pre-assembled bristle arrangement and having a channel to frictionally engage said retention section, said channel extending to an end of at least one of said plates;
each of said plates having a surface which abuts and contacts said bristles of said bristle arrangement and at least one of said surfaces forming a portion of said channel; and
wherein said channel allows movement of said retention section before said plates are secured together and prevents movement of said retention section after said plates are secured together.

2. The brush seal segment of claim 1, wherein said channel has a uniform depth.

3. The brush seal segment of claim 1, wherein said channel has a width corresponding to a width of said retention section and a length greater than a length of said retention section.

4. The brush seal segment of claim 1, wherein said channel is located on at least one of said plates.

5. The brush seal segment of claim 4, wherein said channel is located on both of said plates.

6. The brush seal segment of claim 1, wherein said bristle arrangement comprises a bristle ring.

7. A brush seal segment comprising:
a pre-assembled bristle arrangement having a plurality of bristles and a retention section;
each of said bristles having a first end and a second end opposed to said first end;
said retention section joining said second ends of said bristles together;
first and second plates flanking said bristle arrangement;
said first plate having a first planar surface and said second plate having a second planar surface abutting said first planar surface;
each of said plates having an arcuate portion adjacent a respective one of said first and second planar surfaces and a substantially linear portion adjacent said arcuate portion forming a channel to frictionally engage said retention section on opposed sides of said retention section, said channel extending to an end of at least one of said plates;
wherein said channel allows movement of said retention section before said plates are secured together and prevents movement of said retention section after said plates are secured together; and
wherein said brush seal segment is part of a packing ring.

8. The brush seal segment of claim 7, wherein said packing ring includes a labyrinth seal.

9. A brush seal segment comprising:
a pre-assembled bristle arrangement having a plurality of bristles having a first end and a second end and a retention section joining said bristles to g ether at said second end;
a pair of plates flanking said bristle arrangement and having a channel to frictionally engage opposed sides of said retention section, said channel extending to an end of at least one of said plates;
wherein said channel allows movement of said retention section before said plates are secured together and prevents movement of said retention section after said plates are secured together; and
said plurality of bristles abutting said plates and said retention section consisting of a weld joint securing said bristles together.

* * * * *